United States Patent
Uyeki

(10) Patent No.: US 9,409,492 B2
(45) Date of Patent: Aug. 9, 2016

(54) METHOD FOR PRECISE DEMAND RESPONSE AND CONTROL, AND A SYSTEM THEREOF

(71) Applicant: Honda Motor Co., Ltd., Tokyo (JP)

(72) Inventor: Robert Uyeki, Torrance, CA (US)

(73) Assignee: Honda Motor Co., Ltd., Tokyo (JP)

( * ) Notice: Subject to any disclaimer, the term of this patent is extended or adjusted under 35 U.S.C. 154(b) by 255 days.

(21) Appl. No.: 14/257,150

(22) Filed: Apr. 21, 2014

(65) Prior Publication Data

US 2015/0298567 A1    Oct. 22, 2015

(51) Int. Cl.
*B60L 11/18* (2006.01)

(52) U.S. Cl.
CPC ........... *B60L 11/1848* (2013.01); *B60L 11/184* (2013.01); *B60L 11/1838* (2013.01); *B60L 11/1844* (2013.01); *B60L 11/1846* (2013.01); *B60L 11/1862* (2013.01); *B60L 2240/622* (2013.01); *B60L 2240/70* (2013.01); *B60L 2250/16* (2013.01); *Y02E 60/721* (2013.01); *Y02T 10/7005* (2013.01); *Y02T 10/705* (2013.01); *Y02T 10/7044* (2013.01); *Y02T 10/7072* (2013.01); *Y02T 10/7291* (2013.01); *Y02T 90/121* (2013.01); *Y02T 90/128* (2013.01); *Y02T 90/14* (2013.01); *Y02T 90/16* (2013.01); *Y02T 90/162* (2013.01); *Y02T 90/163* (2013.01); *Y02T 90/168* (2013.01); *Y02T 90/169* (2013.01); *Y04S 10/126* (2013.01); *Y04S 30/12* (2013.01); *Y04S 30/14* (2013.01)

(58) Field of Classification Search
CPC ............ B60L 11/1848; B60L 11/1862; B60L 11/1846; B60L 11/1844; B60L 11/184; B60L 11/1868; Y02T 90/169; Y02T 90/128; Y02T 90/168; Y02T 90/121
See application file for complete search history.

(56) References Cited

U.S. PATENT DOCUMENTS

| | | | | |
|---|---|---|---|---|
| 7,489,106 B1 * | 2/2009 | Tikhonov | ............ | H02J 7/0018 320/116 |
| 8,243,628 B2 * | 8/2012 | Kerr | ........................ | H04L 12/14 370/237 |
| 8,305,032 B2 * | 11/2012 | McKenna | ............ | G07F 15/005 320/104 |
| 8,384,358 B2 * | 2/2013 | Biondo | .................... | H04Q 9/00 320/155 |
| 8,429,630 B2 * | 4/2013 | Nickolov | .............. | G06F 9/4856 717/110 |
| 9,000,722 B2 * | 4/2015 | Uyeki | .................. | H01M 10/44 320/104 |
| 9,020,769 B2 * | 4/2015 | Rada | ........................ | G01D 4/00 702/176 |

(Continued)

*Primary Examiner* — Naum B Levin
(74) *Attorney, Agent, or Firm* — Arent Fox LLP

(57) ABSTRACT

There is a provided a system and a computer-implemented method for reducing electric consumption by an electric vehicle connected to a charging station. The method includes: providing a wireless network for communication between an electric vehicle and a tracking server operated by a trusted entity; collecting, on the tracking server, user and location information for charging electric vehicles (EVs); receiving, at the tracking server, a demand response signal comprising consumption reduction information including sector and time period information from a utility; identifying, at the tracking server, electric vehicles charging in the sector based on each EV's location information; and transmitting, from the tracking server, a charge interruption signal to the identified electric vehicles.

20 Claims, 5 Drawing Sheets

(56) References Cited

U.S. PATENT DOCUMENTS

| | | | |
|---|---|---|---|
| 9,026,347 B2* | 5/2015 | Gadh | B60L 11/1842 320/109 |
| 9,035,607 B2* | 5/2015 | LaFrance | B60L 11/1838 320/109 |
| 2009/0021213 A1* | 1/2009 | Johnson | B60L 11/005 320/109 |
| 2010/0145540 A1* | 6/2010 | McKenna | G07F 15/005 700/295 |
| 2010/0217550 A1* | 8/2010 | Crabtree | H02J 3/005 702/62 |
| 2011/0133693 A1* | 6/2011 | Lowenthal | B60L 11/1824 320/109 |
| 2011/0231028 A1 | 9/2011 | Ozog | |
| 2012/0072039 A1 | 3/2012 | Anderson et al. | |
| 2012/0143410 A1* | 6/2012 | Gallagher | B60L 11/1861 701/22 |
| 2012/0293007 A1* | 11/2012 | Byun | H02J 17/00 307/104 |
| 2012/0323690 A1* | 12/2012 | Michael | G06Q 30/02 705/14.58 |
| 2013/0002188 A1* | 1/2013 | Uyeki | H01M 10/44 320/101 |
| 2013/0006677 A1 | 1/2013 | Anglin et al. | |
| 2013/0035804 A1 | 2/2013 | Nakazawa | |
| 2013/0038284 A1* | 2/2013 | LaFrance | B60L 11/1838 320/109 |
| 2013/0049468 A1 | 2/2013 | Iwasaki et al. | |
| 2013/0132854 A1* | 5/2013 | Raleigh | G06F 3/0482 715/738 |
| 2013/0173075 A1 | 7/2013 | Mitsumoto et al. | |
| 2013/0179061 A1 | 7/2013 | Gadh et al. | |
| 2013/0211988 A1* | 8/2013 | Dorn | B60L 11/1838 705/35 |
| 2013/0217409 A1 | 8/2013 | Bridges et al. | |
| 2013/0274936 A1 | 10/2013 | Donahue et al. | |
| 2013/0289821 A1* | 10/2013 | Nakagawa | B60L 11/1861 701/31.4 |
| 2014/0278687 A1* | 9/2014 | McConky | G06Q 10/06312 705/7.22 |
| 2015/0066224 A1* | 3/2015 | Uyeki | H02J 7/0027 700/291 |
| 2015/0077054 A1* | 3/2015 | Uyeki | H02J 7/0052 320/109 |
| 2015/0102775 A1* | 4/2015 | Von Novak, III | B60L 11/1844 320/109 |
| 2015/0206084 A1* | 7/2015 | Herberg | G06Q 50/06 705/7.23 |

* cited by examiner

METHOD FOR PRECISE DEMAND RESPONSE AND CONTROL, AND A SYSTEM THEREOF

BACKGROUND

1. Field

The present disclosure generally relates to improving electric grid stabilization by leveraging telematics capabilities on the grid and an Electric Vehicle (EV) to send a Demand Response (DR) signal to the EV to offset grid load concerns in a sector, where the DR signal is based on real-time, historical, and/or predictive models of electricity. A method and a system for reducing electricity consumption during a period of grid load concerns are disclosed.

2. Description of the Background

Currently, when a utility detects or predicts an overload situation, they request for volunteers to reduce their electricity usage by sending a Demand Response (DR) signal to all consumers including consumers charging an Electric Vehicle (EV). However, as the quantity of electric vehicles increases and more facilities to publicly charge an EV become available, there is a need to more precisely control the sending of the DR request signal.

Also, the sector or region for a facility where the EV is charging may be different than a home charging sector. A home charging sector is where the EV is usually based and charged. A DR signal sent without considering the current charging location of the EV may misidentify EVs not in their home charging sector, and send incorrect DR signal requests. Additionally, EVs are adapted to charge at various facilities that may not be owned or operated by the vehicle user. By charging at public facilities, an entity other than the vehicle user may make the decision on whether to comply with the DR request. Without a reliable method to identify and communicate with the EV user, this decision may adversely affect the needs of the EV user. As the quantity of EVs, public charging facilities and the EVs range increases, there is a need to more precisely control the sending of the DR request signal by identifying EVs, their quantity and locations of the EVs.

SUMMARY

It is to be understood that both the foregoing general description and the following detailed description are exemplary and explanatory and are intended to provide further explanation of the disclosure as claimed.

According to exemplary embodiments, there is provided a computer-implemented method for a computer-implemented method for reducing electric consumption by an electric vehicle connected to a charging station. The method includes: providing a wireless network for communication between an electric vehicle and a tracking server operated by a trusted entity; collecting, on the tracking server, user and location information for charging electric vehicles (EVs); receiving, at the tracking server, a demand response signal comprising consumption reduction information including sector and time period information from a utility; identifying, at the tracking server, electric vehicles charging in the sector based on each EV's location information; and transmitting, from the tracking server, a charge interruption signal to the identified electric vehicles.

According to exemplary embodiments, there is provided a vehicle system reducing electric consumption by an electric vehicle connected to a charging station. The system includes: a tracking server operated by a trusted entity; and a wireless network for communicating between an electric vehicle and the tracking server. The tracking server is configured to collect user and location information for charging electric vehicles (EVs); receive a demand response signal comprising consumption reduction information including sector and time period information from a utility; identify electric vehicles charging in the sector based on each EV's location information; and transmit a charge interruption signal to the identified electric vehicles.

Additional features of the invention will be set forth in the description that follows, and in part will be apparent from the description, or may be learned by practice of the invention.

BRIEF DESCRIPTION OF THE DRAWINGS

The accompanying drawings, which are included to provide a further understanding of the disclosure and are incorporated in and constitute a part of this specification, illustrate embodiments of the disclosure, and together with the description serve to explain the principles of the disclosure. A dataflow diagram is an abstract representation of information flowing in and out of the system and from place to place within the system, and where it may be operated upon by different elements of the system. Different elements may be operated on by modules or processes within the system, and data from these modules may flow to another module.

DESCRIPTION

Figure 1:
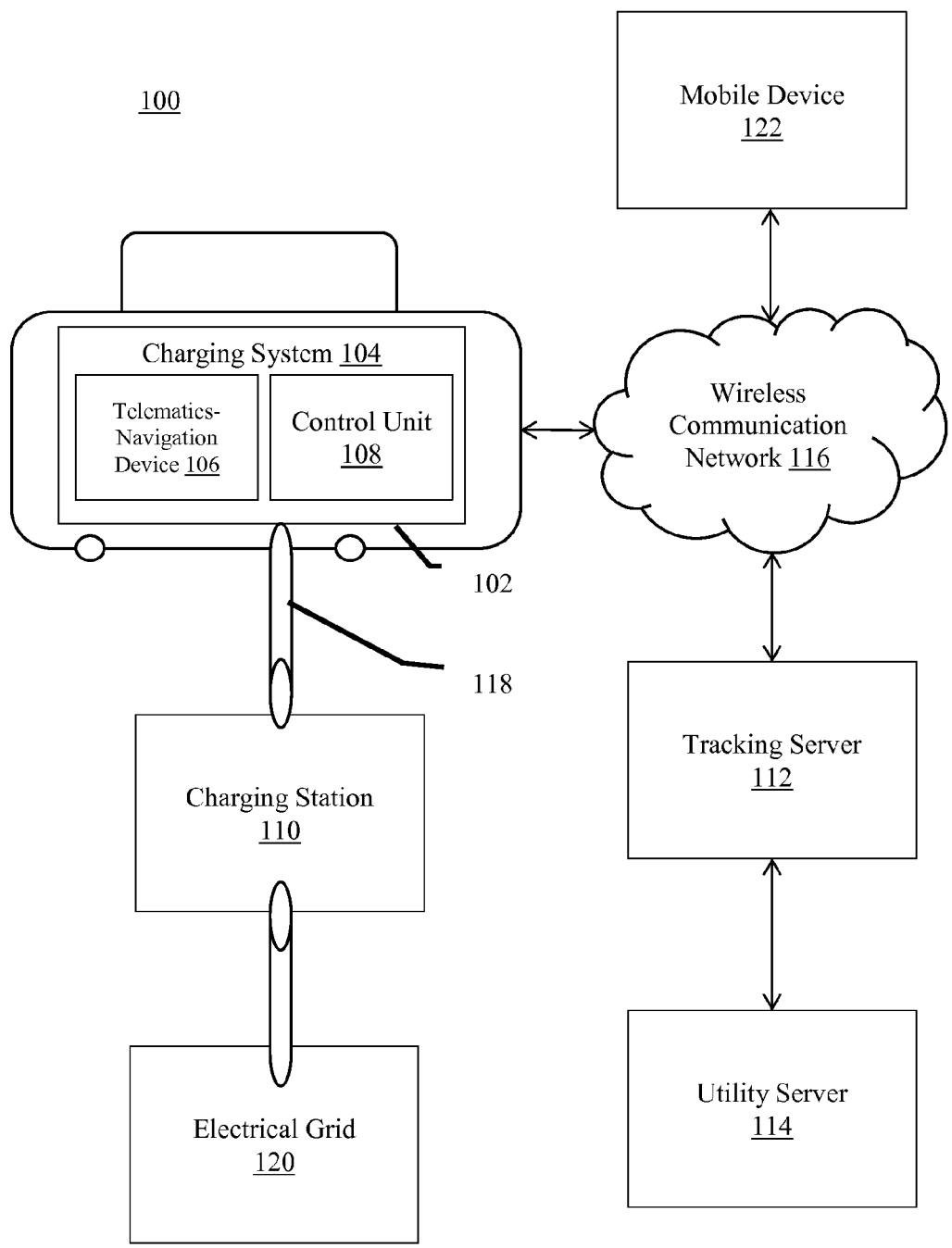
FIG. 1 illustrates a typical vehicle communication environment in accordance with one embodiment of the present application.

The disclosure is described more fully hereinafter with reference to the accompanying drawings, in which exemplary embodiments of the disclosure are shown. This disclosure may, however, be embodied in many different forms and should not be construed as limited to the embodiments set forth herein. Rather, these exemplary embodiments are provided so that this disclosure is thorough, and will fully convey the scope of the disclosure to those skilled in the art. It will be understood that for the purposes of this disclosure, "at least one of X, Y, and Z" may be construed as X only, Y only, Z only, or any combination of two or more items X, Y, and Z (e.g., XYZ, XZ, XYY, YZ, ZZ). Throughout the drawings and the detailed description, unless otherwise described, the same drawing reference numerals are understood to refer to the same elements, features, and structures. The relative size and depiction of these elements may be exaggerated for clarity.

The terminology used herein is for describing particular embodiments only and is not intended to be limiting of the present disclosure. As used herein, the singular forms "a," "an" and "the" are intended to include the plural forms as well, unless the context clearly indicates otherwise. Furthermore, the use of the terms a, an, etc. does not denote a limitation of quantity, but rather denotes the presence of at least one of the referenced item. The use of the terms "first," "second," and the like does not imply any particular order, but they are included to identify individual elements. Moreover, the use of the terms first, second, etc. does not denote any order or importance, but rather the terms first, second, etc. are used to distinguish one element from another. It will be further understood that the terms "comprises" and/or "comprising", or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof. Although some features may be described with respect to individual exemplary embodiments, aspects need not be limited thereto such that features from one or more exemplary embodiments may be combinable with other features from one or more exemplary embodiments.

Some portions of the detailed description that follows are presented in terms of algorithms and symbolic representations of operations on data bits within a computer memory. These algorithmic descriptions and representations are used by those skilled in the data processing arts to most convey the substance of their work to others skilled in the art. Here, and generally, an algorithm is conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

However, all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the embodiments include process steps and instructions described herein in the form of an algorithm. The process steps and instructions of the embodiments may be embodied in software, firmware or hardware, and when embodied in software, may be downloaded to reside on and be operated from different platforms used by a variety of operating systems.

In addition, the language used in the specification has been principally selected for readability and instructional purposes, and may not have been selected to delineate or circumscribe the inventive subject matter. Accordingly, the embodiments are intended to be illustrative, but not limiting, of the scope of the embodiments, which is set forth in the claims.

The embodiments also relate to an apparatus for performing the operations herein. This apparatus may be specially constructed for the required purposes, or it may be a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings of the embodiments, and any references below to specific languages are provided for enablement and best mode of the embodiments.

The present disclosure improves electric grid stabilization by leveraging telematics capabilities on the grid and an Electric Vehicle (EV) to send a Demand Response (DR) signal to the EV to offset grid load concerns. The grid load may be caused by clustering of too many electricity consuming devices. The DR signal may be based on real-time, historical, and/or predictive models of electricity. The DR signal provides information on a sector or region subject to the grid load concerns. By identifying EVs within the sector or region using the EV location information, the DR signal may be targeted.

In exemplary embodiments, the quantity of EVs that should receive a charge interruption request may be determined. In exemplary embodiments, an EV user of the selected/identified EVs may be identified. An identified EV user may select or elect to comply with a charge interruption or load reduction request generated by a tracking server per the DR signal from the utility server.

Vehicles are mobile, and are adapted to charge at various facilities that may not be owned or operated by the vehicle user. By charging at public facilities, an entity other than the user may make the decision on whether to comply with the DR request. Without a reliable method to identify and communicate with the EV user, this decision may adversely affect the needs of the EV user. As the quantity of EVs and public charging increases, there is a need to more precisely control the sending of the DR request signal by identifying EVs, their quantity and locations of the EVs.

FIG. 1 is a block diagram of a vehicle communication environment according to exemplary embodiments. FIG. 1 illustrates a vehicle communication environment 100 including an electric vehicle (EV) 102, a tracking server 112, and a utility server 114. The tracking server 112 may be connected by a wireless communication network 116.

The wireless communication network 116 may be proprietary and accessible only to a trusted entity, such as, an Original Equipment Manufacturer (OEM). In some embodiments the wireless communication network 116 may share a physical medium with other networks also utilizing the physical medium. The tracking server 112 may be connected to the utility server 114 by a network other than the wireless communication network 116. In exemplary embodiments, the wireless communication network 116 may be shared but provide a trusted communication path between the tracking server 112 and the charging system 104. In exemplary embodiments, the wireless communication network 116 may include a satellite-based communication network that connects the charging system 104 of the electric vehicle 102 with a tracking server 112.

The EV 102 includes an electric motor (not shown) for propulsion of the vehicle 102. In exemplary embodiments, the EV 102 may be propelled by one or more electric motors. In exemplary embodiments, the EV 102 may be propelled by one or more electric motors and another engine, for example, an internal combustion engine or a plug-in hybrid electric vehicle.

The one or more electric motors of the EV 102 may be powered by rechargeable batteries (not shown) on-board the vehicle 102. The on-board batteries may be charged when the EV 102 is connected or coupled to the charging station 110. In exemplary embodiments, the EV 102 may be connected to a charging station 110 via a charging cable 118. In exemplary embodiments, the EV 102 may be charged wirelessly, for example, by disposing the EV 102 proximate or adjacent to the charging station 110. The charging station 110 provides electric energy to the EV 102, for example, by charging or recharging the batteries of the EV 102. The electric energy may be supplied to the charging station 110 by a utility company through an electrical grid 120. In exemplary embodiments, the charging station 110 may be connected to the electrical grid 120 via an industry standard circuit, such as, a 110/120 volt circuit, a 220/240 volt circuit, or a higher voltage circuit. In exemplary embodiments, the charging station 110 may be located at the home of the EV's user. In exemplary embodiments, the charging station 110 may be at a public location, for example, a workplace, a shopping center, a charging service, or the like. In exemplary embodiments, the on-board batteries may be charged using regenerative braking.

The charging system 104 manages the charging of the EV 102. The charging system 104 includes a telematics-navigation device 106 and a control unit 108. The telematics-navigation device 106 may exchange information with users of the telematics-navigation device 106 and entities connected to the wireless communication network 116. The telematics-navigation device 106 may receive charging instructions from a user when the EV 102 is connected to a charging station. When the EV 102 is being charged, the telematics-navigation device 106 may provide charging information to the tracking server 112. The telematics-navigation device 106 may receive charging instructions from the tracking server 112 when the EV 102 is connected to a charging station. In exemplary embodiments, the telematics-navigation device 106 may receive instructions from the tracking server 112 when the EV 102 is connected to a charging station, for example, a charge interruption signal, a charge resume signal, a charge interruption forecast signal, a charge resume forecast signal, or the like.

The control unit 108 controls the charging of the EV 102. Charging the EV 102 includes the charging of the EV's rechargeable batteries. When the EV 102 is connected to a charging station, the control unit 108 determines a strategy for charging the EV 102 based on a charging mode selected by a user. The control unit 108 charges the EV according to the determined strategy. In exemplary embodiments, the control unit 108 may charge the EV according to instructions from the tracking server 112 when the EV 102 is connected to a charging station. The instructions may include a charge interruption signal, a charge resume signal, a charge interruption forecast signal, a charge resume forecast signal, or the like. The control unit 108 may integrate the strategy specified by the user with the charge interruption signal from the tracking server 112.

In exemplary embodiments, a user may select an "economic" charging mode. In the economic mode, the control unit 108 may initiate the charging of the EV 102 by allowing electric energy to flow to the EV 102 from the charging station. The control unit 108 may initiate the charging regardless of the current cost of electric energy. The control unit 108 may allow the EV 102 to charge until the state of charge of the EV 102 reaches a minimum state of charge. As used herein, the term "state of charge" refers to the amount of electric charge/energy stored in the EV's batteries. Once the minimum state of charge is reached, the control unit 108 halts the charging of the EV 102 by stopping the flow of electric energy from the charging station to the EV 102. The control unit 108 may reinitiate the charging of the EV 102 when the cost of electric energy is economical, such as, during off-peak times. As an example of integrating the user selected strategy with a charge interruption signal from the tracking server 112, the control unit 108 may delay complying with the charge interruption signal until the EV 102 has attained a minimum state of charge.

The minimum state of charge may be determined by the user or may be determined by the control unit 108 based, for example, on a usage pattern. The minimum state of charge is typically enough energy to allow a driver to use the vehicle in case of an emergency or to run an errand and return home. The minimum state of charge may be enough, for example, to go to a nearby grocery store or hospital and return home.

The tracking server 112 helps reduce electric consumption in different sectors. A sector is an area of land that may include EVs, homes, businesses, and other entities that consume electric energy from an electrical grid. In exemplary embodiments, a utility company divides a city into sectors and provides geographic coordinates of each sector to the tracking server 112 and as well as an identifier for each sector. In exemplary embodiments, one or more cities form a sector. When electric energy consumption in a sector exceeds an electric supply in the sector, the electric grid in the sector destabilizes. The tracking server 112 helps avoid grid destabilization by stopping a charging of an EV in the sector in response to a Demand Response (DR) signal sent to the tracking server 112 by the utility serer 114. In exemplary embodiments, the tracking server 112 uses the consumption reduction information received with the DR signal. The consumption reduction information is used to identify EVs charging in the sector, for example, by determining which currently charging EVs are within the area defining the sector identified in the DR signal. When the location of the EV 102 is within the sector specified by the consumption reduction information included in the DR signal, the tracking server 112 may initiate or transmit a charge interruption signal to the identified EV.

When the EV 102 is connected to the charging station 110, the EV 102 transmits to the tracking server 112 charging information including its state of charge. Based on the charging information, the tracking server 112 determines or maps the present location of the EV a sector of the utility or electric grid. The tracking server 112 monitors the EVs connected to the electrical grid. The tracking server 112 may monitor the total electric energy consumption by the electric vehicles currently charging. The tracking server 112 may monitor the total energy consumption of the electrical vehicles by sector.

The tracking server 112 may receive a DR signal from a utility server 114. When the DR signal is received from the utility server 114, the tracking server 112 determines a strategy to reduce electricity cut consumption in the desired sector by stopping or delaying the charging of one or more of the EVs in the sector. Based on the determined strategy, the tracking server 112 transmits charge interruption instructions to EVs charging in the sector. An EV receiving the instructions charges according to the instructions instead of continuing to charge according to a strategy determined by the EV. In exemplary embodiments, the strategy includes obtaining the electric vehicles users consent prior to stopping or delaying the charging of the electric vehicle associated with the user. The strategy may be, for example, for the EV to charge to or above a minimum SOC, to charge outside a time window for which a DR signal has been received, or to stop charging the electric vehicle immediately. In exemplary embodiments, the EV may be charged to a minimum safe SOC for the EV, where the minimum safe SOC for the EV is less than or equal to the minimum SOC level set by a user.

In exemplary embodiments, the tracking server 112 may receive information for and control the charging of EVs whose users have enrolled in such a program. Under the program, the tracking server 112 is allowed to control the charging of the EVs, when necessary. In return for allowing the charging of the EV 102 to be interrupted by a request on behalf of the utility, the user may receive a discounted electricity rate.

In exemplary embodiments, the tracking server 112 is maintained by a trusted entity, such as, a car manufacturer. In one embodiment, the tracking server 112 only receives information and controls the charging of EVs produced by the car manufacturer. In exemplary embodiments, the car manufacturer is Honda Motor Company. A benefit of the car manufacturer maintaining the tracking server 112 is that the information received from EVs may be confidentially maintained and that information is not provided to other entities, such as, a utility company. The tracking server 112 may maintain a user database associating an electric vehicle to a user. The association may map a user to an electric vehicle in a one-to-one, one-to-many, or many-to-many relationship. A user associated with the electric vehicle may receive and consent to the charge interruption in response to a charge interruption request from the tracking server 112. The charge interruption request from the tracking server 112 may be generated in response to a DR signal from the utility server 114.

In exemplary embodiments, the tracking server 112 may communicate with the vehicle user's mobile device 122. The user database may include device information to connect to the mobile device 122. The device information may include a mobile telephone number, an email address, and the like to communicate with the vehicle user. In exemplary embodiments, the mobile device 122 may include an application to communicate with the trusted server 112. The mobile device 122 may receive a charge interruption request from the tracking server 112. The mobile device 122 may transmit a charge interruption response to the tracking server 112. The charge interruption response may approve or disapprove the charge interruption request.

The utility server 114 provides information about electric energy to different entities, such as, the tracking server 112, the charging station 110, the EV 102. In exemplary embodiments, information transmitted by the utility server 114 to the tracking server 112 includes a DR signal. Utilities employ a demand response to reduce the charge lower in exchange for reduced electricity rates. When the utility detects or projects an overload situation, a utility may request for volunteers to reduce their electricity usage. Vehicles are unique as they consume large amounts of electricity (a large electrical load) and are mobile. As such, if the EV 102 has moved to a sector where electric consumption need not be reduced, a DR signal from the utility may incorrectly interrupt charging of the EV 102. This may unnecessarily inconvenience the EV user and unnecessarily reduce the utility's revenue.

The DR signal may include consumption reduction information. The consumption reduction information may identify time periods when the electric consumption needs to be reduced. The consumption reduction information may identify sectors for which the electric consumption is to be reduced. The consumption reduction information may identify future time periods for which electric consumption is to be reduced in particular sectors. The consumption reduction information may identify the quantity of electricity by which the consumption needs to be reduced.

In exemplary embodiments, information transmitted to the EV 102 or charging station 110 includes cost information for the electric energy. In exemplary embodiments, the cost information is Time of Use (TOU) rates where the rates for electric energy vary based on time, day, month, and/or season. For example, the cost information for electric energy during summer months may be $0.14 per KWh during peak hours (e.g., 12 PM to 7 PM), $0.07 per KWh during part-peak hours (e.g., 10 AM to 12 PM and 7 PM to 10 PM), and $0.03 per KWh during non-peak hours (e.g., 12:00 AM to 10 AM and 10 PM to 11:59 PM).

In exemplary embodiments, the utility company may offer special rates to the user of the EV 102 for allowing the tracking server 112 to control the EV's charging. Therefore, in one embodiment, the tracking server 112 responds to the DR signal from the utility server 114 with identifying information of the EV 102 (e.g., vehicle identification number (VIN) of the EV 102) that reduces electricity consumption in response to the DR signal. In exemplary embodiments, the information includes identifying information of the EV user (e.g., user's name, address or utility account number).

In exemplary embodiments, the utility server 114 transmits requests to the tracking server 112 for reducing electricity consumption in a sector. For the sector, the tracking server 112 transmits to the utility server 114 the current total electric energy consumption in the sector by the electric vehicles. The electric vehicles may be charging at charging stations, homes, and businesses. In exemplary embodiments, the tracking server 112 transmits information on the total electric energy consumption by EVs in a sector to the utility server 114.

In exemplary embodiments, the utility server 114 is maintained by a utility company. In exemplary embodiments, the utility server 114 is maintained by a third-party that obtains information from one or more utility companies.

The wireless communication network 116 represents a communication pathway between the EV 102 and the tracking server 112. In exemplary embodiments, the wireless communication network 116 is a satellite-based network including a base station, controller, and a core network including multiple switching entities and gateways. In exemplary embodiments, the wireless communication network 116 is a Wireless Local Area Network (WLAN) that provides wireless communication over a large geographic area, such as, a city, county, a state, a country or the like.

Figure 2:
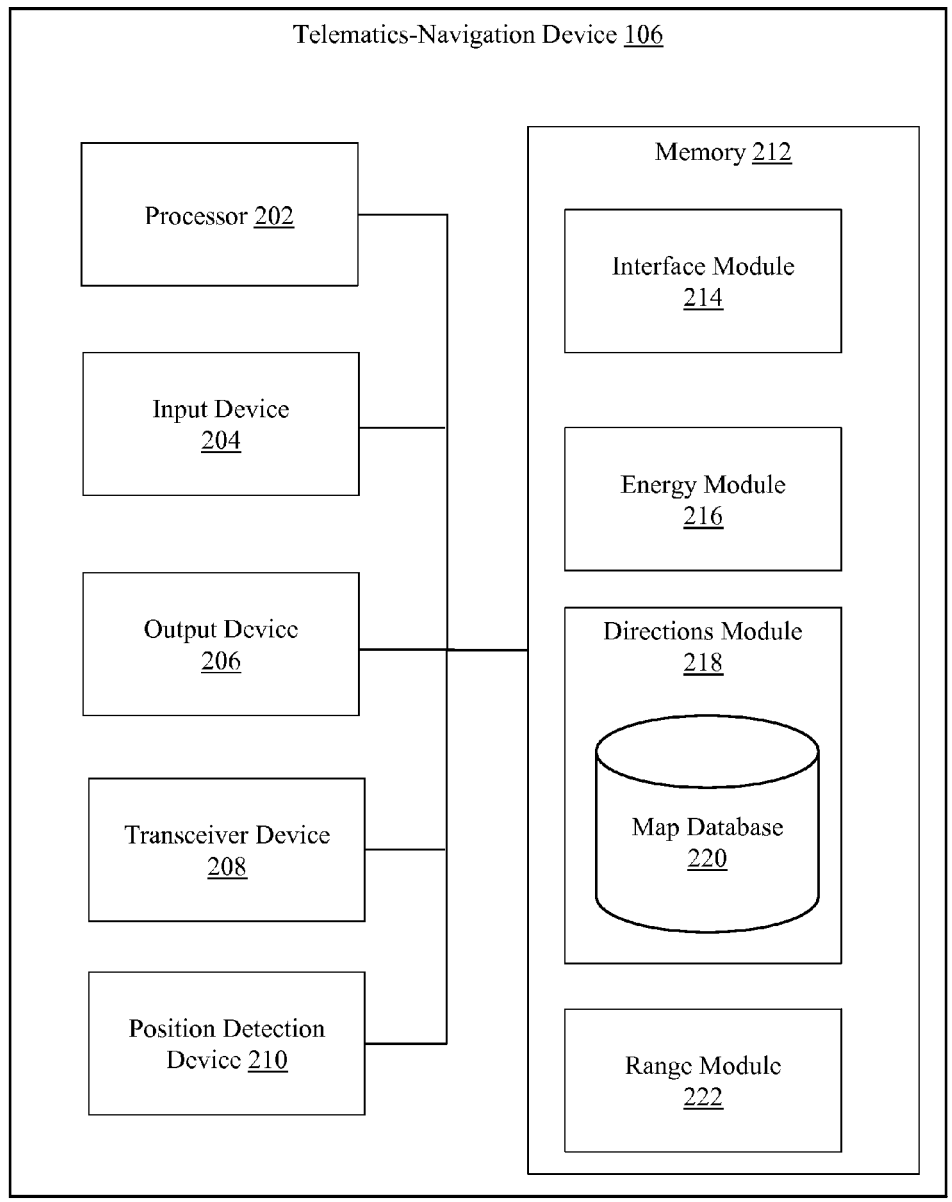
FIG. 2 illustrates a typical telematics-navigation device in accordance with one embodiment of the present application.

FIG. 2 illustrates a telematics-navigation device according to exemplary embodiments. A telematics-navigation device 106 includes a processor 202, an input device 204, an output device 206, a transceiver device 208, a position detection device 210, and a memory 212.

The processor 202 processes data signals and includes various computing architectures including a complex instruction set computer (CISC) architecture, a reduced instruction set computer (RISC) architecture, or an architecture implementing a combination of instruction sets. Although only a single processor is illustrated in FIG. 2, multiple processors may be included. The processor 202 includes an arithmetic logic unit, a microprocessor, a general purpose computer, or some other information appliance equipped to transmit, receive and process electronic data signals from the memory 212, the input device 204, the output device 206, the transceiver device 208, or the position detection device 210.

The input device 204 is configured and arranged to provide user input to the telematics-navigation device 106. An exemplary input device 204 may include a cursor controller, a keyboard, a touchscreen device, a microphone, a haptic feedback device, or the like. In exemplary embodiments, the input device 204 may include an alphanumeric input device, such as, a QWERTY keyboard, a key pad or representations of such created on a touch screen, configured and arranged to communicate information and/or command selections to processor 202 or memory 212. In exemplary embodiments, the input device 204 may include a user input device to communicate positional data and/or command selections to processor 202. The input device 204 may include a joystick, a mouse, a trackball, a stylus, a pen, a touch screen, cursor direction keys or the like to cause movement adjustment of an image.

The output device 206 includes a device configured and arranged to display electronic images and data as described herein. Output device 206 may include, for example, an organic light emitting diode display (OLED), liquid crystal display (LCD), cathode ray tube (CRT) display, or the like. In exemplary embodiments, output device 206 may include a touch-sensitive touch screen including a transparent panel cover disposed over or integrated with the screen of output device 206. In exemplary embodiments, the output device 206 includes a speaker that outputs audio as described herein.

The transceiver device 208 includes a device configured and arranged to communicate with entities connected to the wireless communication network 116. In exemplary embodiments, the telematics-navigation device 106 uses the transceiver device 208 to communicate with remote systems or devices, such as, the tracking server 112 and the utility server 114.

The position detection device 210 includes a device configured and arranged to communicate with a positioning satellite (e.g., global positioning system (GPS) satellites) to determine a geographical location of the EV 102. In exemplary embodiments, the position detection device 210 searches for and collects GPS information or signals from three, four or more GPS satellites to determine the location of the EV 102. Using the time interval between the broadcast time and reception time of each signal, the position detection device 210 may calculate the distance between the EV 102 and each of the GPS satellites. These distance measurements, along with the position and time information received in the signals, allow the position detection device 210 to calculate or determine the geographical location and/or attitude of the EV 102. The geographical location and/or attitude of the EV 102 may be provided to the tracking server 112.

The memory 212 stores instructions and/or data that may be executed by processor 202. The instructions and/or data may code for performing any and/or all of the techniques described herein. Memory 212 may be a Dynamic Random Access Memory (DRAM) device, a Static Random Access Memory (SRAM) device, Flash RAM (non-volatile storage), combinations of the above, or the like. The memory 212 may store an interface module 214, an energy module 216, a directions module 218, and a range module 422. The modules may communicate with the processor 202, the input device 204, the output device 206, the transceiver 208, and/or the position detection device 210.

The interface module 214 communicates with users of the telematics-navigation device 106. The interface module 214 receives from a user (e.g., a driver or passenger of the EV 102) a selection of a mode for charging the EV 102 when the EV 102 is connected to a charging station. In exemplary embodiments, a user may select a charging mode including a consumption reduction, load shedding mode or Demand Response (DR) mode.

In exemplary embodiments, the DR mode may include specifying a minimum State of Charge (SOC) for the EV 102 before the EV 102 stops charging in response to a DR signal from the tracking server 112. In exemplary embodiments, the DR mode may include contacting a user of the EV 102 and receiving an approval from the user, before interrupting the charging of the EV 102 in response to a DR signal from the tracking server 112. In exemplary embodiments, the approval from the user may select a minimum SOC for the EV 102, before interrupting the charging of the EV 102 in response to a charge interruption signal from the tracking server 112.

In exemplary embodiments, the minimum SOC may be set by the manufacturer of the EV 102 (e.g., 10 percent, 20 percent, enough to drive for 10 miles, 20 miles, 30 miles, 60 miles etc.). In exemplary embodiments, a user provides or sets the minimum state of charge with the interface module 214. In DR mode, the EV 102 may charge to a maximum SOC greater than a minimum SOC when no charge interruption signal is received from the tracking server 112 during the charging to the maximum SOC. In exemplary embodiments, in DR mode the EV 102 may charge to the minimum SOC, stop charging for the time period requested in the DR signal when a DR signal is received from the tracking server, and resume charging after the end time period in the DR signal has passed. In exemplary embodiments, the EV 102 may resume charging before the end time specified in the DR signal when the EV's SOC is less than the minimum SOC. In exemplary embodiments, the EV 102 may resume charging when the electric energy is economical and a charge interruption signal is being processed during a time period when electricity is economical. In exemplary embodiments, electricity is economical when the cost of energy is below peak hour cost (e.g., cost during part-peak and off-peak hours). Peak hours are when there is the highest demand for electric energy on an electrical grid. In exemplary embodiments, economical is the cost of energy during off-peak hours. In exemplary embodiments, a user provides or sets the interface module 214 with a price range for what is considered economical.

In exemplary embodiments, the interface module 214 communicates with a user via the input device 204 and output device 206. In exemplary embodiments, the interface module 214 may communicate with a user via a mobile device 122 of the user. For example, the mobile device 122 may include an application that allows the user to select the charge mode and provide settings for each mode. The mobile device transmits to the interface module 214 the user's selections and settings. In exemplary embodiments, the EV 102 transmits the user's selections and settings to the tracking server 112.

The energy module 216 obtains information on electric energy from the utility server 114 or the tracking server 112. In exemplary embodiments, the information that the energy module 216 obtains from the utility server 114 includes cost information for electric energy, times when electric energy is generated using a renewable energy source, information on the total electric energy consumption of one or more sectors, or information on the total electric energy storage capacity of one or more sectors. In exemplary embodiments, the cost information obtained by the energy module includes current time of use rates for electric energy.

In exemplary embodiments, the energy module 216 periodically requests electric energy information from the utility server 114. For example, information may be requested every day, once a month, or once per calendar season. In exemplary embodiments, the energy module 216 requests electric energy information from the utility server 114 every time the EV 102 is connected to a charging station. When the energy module 216 receives electric energy information from the utility server 114, the energy module 216 may provide the information to the control unit 108.

The directions module 218 provides a user of the EV 102 with driving directions to a destination. When a request is received from a user for directions to a destination, the directions module 218 obtains the current geographic location of the EV 102 from the position detection module 210. The directions module 218 uses one or more maps stored in a map database 420 to identify routes from the current location of the EV 102 to the destination.

The range module 422 determines the driving range of the EV 102. The range of the EV 102 includes the distance that the EV 102 may travel before it no longer has energy to travel.

Figure 3:
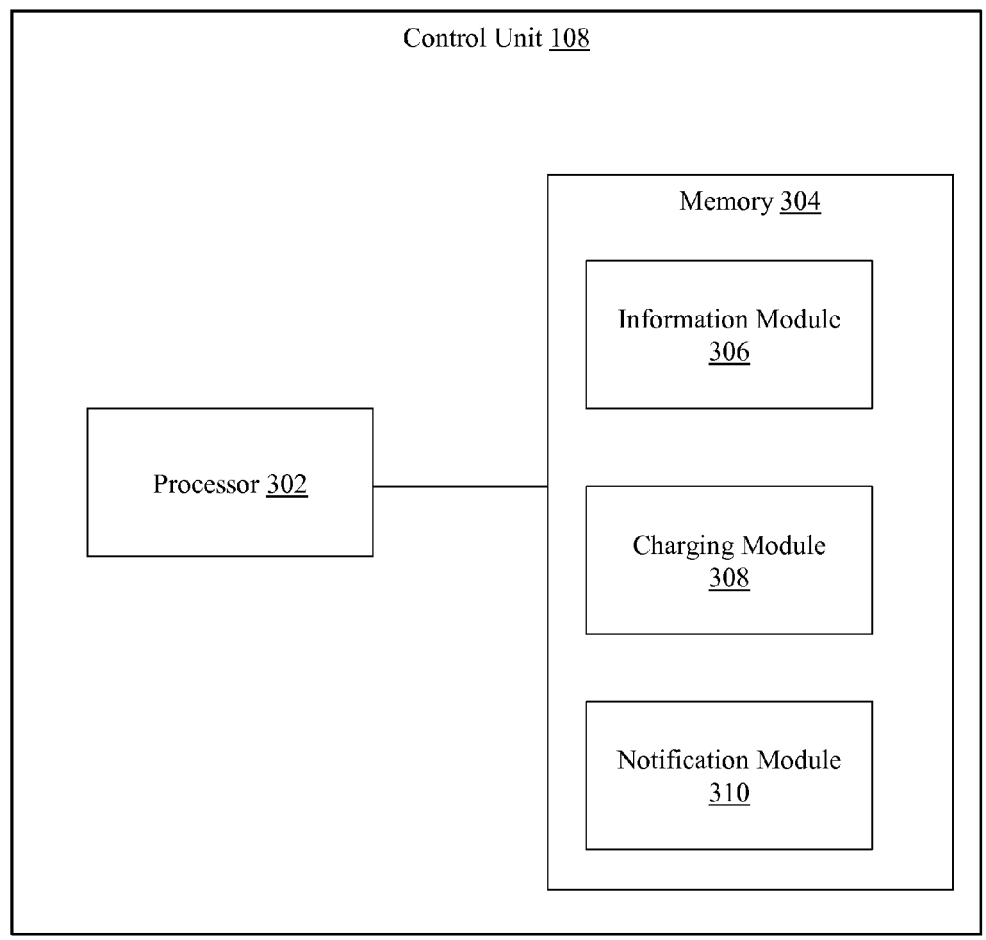
FIG. 3 illustrates a typical charging unit in accordance with one embodiment of the present application.

FIG. 3 illustrates a control unit 108 according to exemplary embodiments. The control unit 108 includes a processor 302 and a memory 304. In exemplary embodiments, the processor 302 and memory 304 may be functionally equivalent to the processor 202 and memory 212 of the telematics-navigation device 106. The memory 304 may include an information module 306, a charging module 308, and a notification module 310.

The information module 306 provides charging information to the tracking server 112. In exemplary embodiments, when the EV 102 is connected to a charging station and charging, the information module 306 periodically (e.g., every 15 minutes) transmits charging information to the tracking server 102. In exemplary embodiments, the information module 306 transmits charging information to the tracking server 112 when the EV 102 starts charging and when the charging stops. The charging information transmitted to the tracking server 112 by the information module 306 includes one or more of the following: the current time, time when charging started, time when charging stopped, the current geographic location of the EV 102, a VIN of the EV 102, information about an EV user (e.g., user's identifier, name, address), information about the charging station (e.g., voltage at the charging station), the current flow, the current state of charge of the EV 102, combination thereof, and the like.

Charging module 308 manages the charging of the EV 102. When the EV 102 is connected to a charging station for charging, the charging module 308 determines a strategy for charging the EV 102 based at least on a charging mode selected by a user through the telematics-navigation device 106.

If DR charging mode was selected, the strategy determined by the charging module 308 for charging the EV 102 includes the charging module 308 may interrupt charging of the EV 102. In exemplary embodiments, the charging module 308 may determine whether the current state of charge of the EV 102 is less than a minimum state of charge. If the current state of charge is below the minimum state of charge, the charging module 308 may deny or disapprove the interruption of the charging of the EV 102 regardless of the current cost of electric energy or a charge interruption signal from the tracking server 112. The disapproval by the charging module 308 may be based on user settings.

In exemplary embodiments, if the charging module 308 receives charging instructions from the tracking server 112, instead of charging according to the strategy determined by the charging module 308, the charging module 308 charges the EV 102 according to the instructions received from the tracking server 112. In other words, the instructions received from the tracking server 112 may override the strategy determined by the charging module 308 for charging the EV 102.

The notification module 310 transmits messages to a user of the EV 102. In exemplary embodiments, when the charging module 308 receives instructions for charging the EV 102 from the tracking server 112, the notification module 310 sends a message with information as to how the EV 102 will be charged according to the instructions. For example, if instructions received from the tracking server 112 indicate to interrupt or delay charging for two hours, the notification module 310 sends a message to the user that states that charging of the EV 102 will be interrupted for two hours. Based on information received from the tracking server 112, the notification module 310 may include an explanation of why the EV 102 is being charged in the message according to instructions from the tracking server 112. For example, the explanation may be that the electric consumption in the sector is too high and the charging will resume after the time period requested in the DR signal has elapsed. In exemplary embodiments, the notification module 310 transmits messages to the user of the vehicle when one or more of the following occurs: when the charging module 308 initiates the charging of the EV 102, when charging of the EV is stopped, when charging of the EV is interrupted, when charging of the EV is resumed after an interruption, when the EV 102 has reached full charge, or the like.

In exemplary embodiments, messages are transmitted by the notification module 310 to the user's mobile device as short message service (SMS) messages or multimedia messaging service (MMS) messages. In exemplary embodiments, messages are transmitted by notification module 310 to the user's mobile device and appear on the mobile device as part of a mobile application that provides information about the EV 102. In exemplary embodiments, messages are transmitted to the user's email address as emails.

Figure 4:
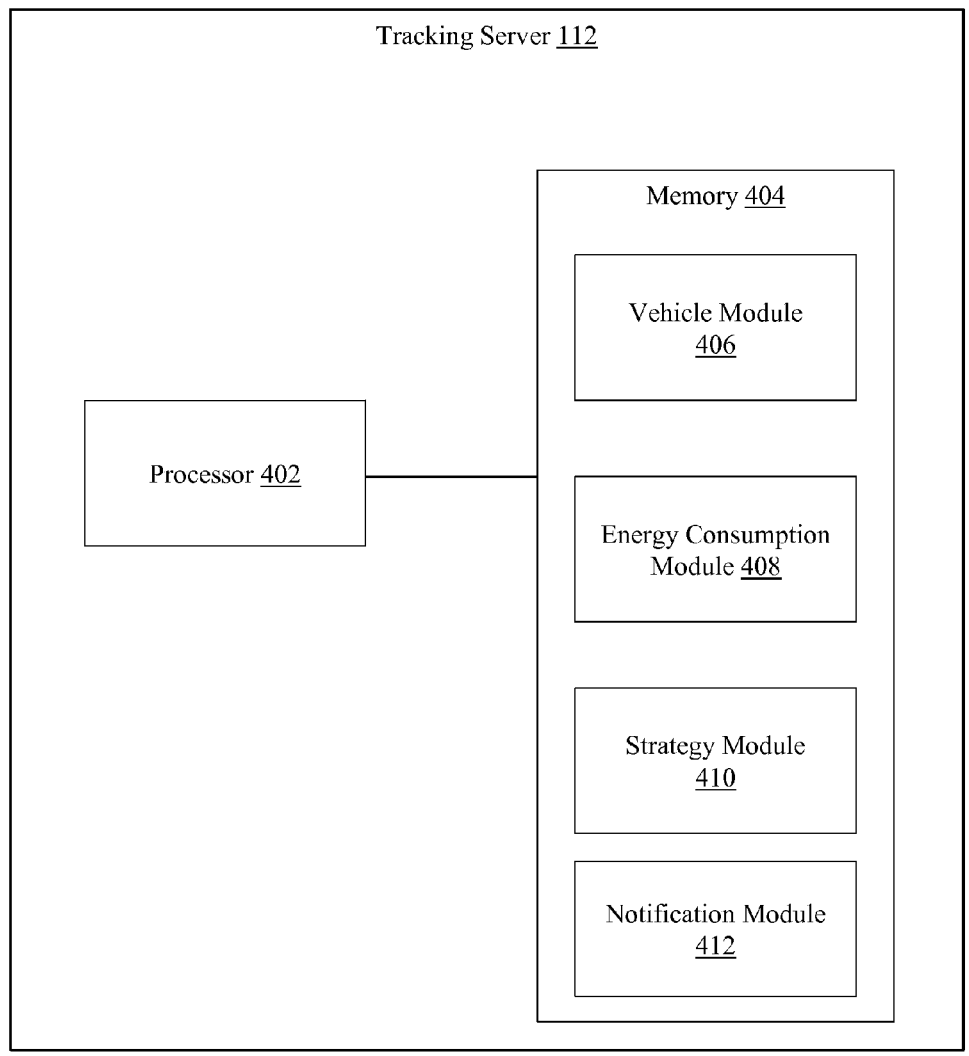
FIG. 4 illustrates a typical tracking server in accordance with one embodiment of the present application.

FIG. 4 illustrates a tracking server according to exemplary embodiments. The tracker server 114 includes a processor 402 and a memory 404. In exemplary embodiments, the processor 402 and memory 404 are functionally equivalent to the processor 202 and memory 212 of the telematics-navigation device 106. The memory 404 stores a vehicle module 406, an energy consumption module 408, and a strategy module 410.

The vehicle module 406 tracks EVs charging in different sectors. The vehicle module 406 maintains a list of EVs charging in each sector. When an EV transmits charging information indicating that the EV is charging, the vehicle module 406 identifies from the charging information a current geographical location of the EV. The vehicle module 406 determines or identifies a sector, per the utility, associated with the EV's geographical location. The determination may be performed by mapping the geographical location of the EV to sectors as defined by the utility. The vehicle module 406 determines whether the EV is included in the list of EVs charging in each sector. If the EV is not included in the list, the vehicle module 406 adds the EV to the list (e.g., the VIN of the EV) under the identified sector along with charging information received. If the EV is already included in the list, the vehicle module 406 updates charging information included in the list for the EV based on the last information received. For example, if the current state of charge of the EV is 70% and the list indicates that it is 30%, the vehicle module 406 will update the list to indicate that it is 70%. Here, the list is merely an exemplary structure and other structures well known in the art may be substituted.

When an EV transmits charging information that indicates that the charging of the EV has stopped, the vehicle module 406 identifies the sector associated with the EV's current location. The vehicle module 406 removes the EV under the identified sector from the list.

The energy consumption module 408 tracks electric energy consumption by electric vehicles for sectors and processes DR signals from the utility server 114. In exemplary embodiments, the energy consumption module 408 receives and processes a DR signal including consumption reduction information from the utility server 114. The DR signal may specify the energy consumption reduction amount. The DR signal may specify a time period in which energy consumption should be reduced. The time period may specify a start time of the energy consumption reduction period to be immediate or sometime in the future. The future time period may begin within an hour, within three hours, within six hours, within 12 hours, within a day, within a week, or the like. The time period may specify an end time of the energy consumption reduction period.

The strategy module 410, when necessary, controls the charging of EVs to reduce the electricity consumption for sectors. When the total electric energy storage consumption of a sector needs to be reduced, for example, to comply with a DR signal from a utility server 114, the strategy module 410 obtains, for example, from the vehicle module 406, information on EVs charging in the sector. The strategy module 410 determines a strategy for identifying the EVs in the sector in a way that will reduce consumption of electric energy in the EVs in the sector. The strategy module 410 may determine a count for the number of electric vehicles that should interrupt their respective charging to reduce energy consumption in the sector specified by the consumption reduction information. The electric vehicle count may be used to identify one or more electric vehicles currently charging in the sector. In exemplary embodiments, when the DR signal specifies a future time period the strategy module 410 may identify vehicles that historically charge in the sector at the specified future time period. The tracking server 112 may transmit a DR signal to each of the identified EVs to interrupt the charging of the identified EVs. The tracking server 112 may transmit a charge interruption message to users of the identified EVs.

In exemplary embodiments, the strategy determined by the strategy module 410 reduces the rate at which electricity consumption is being shed in the sector by their respective charging stations. In exemplary embodiments, the strategy staggers the charge interruption of the EVs in the sector so that the EVs stay above the minimum SOC set for the EV. Under this embodiment, the strategy consists of the strategy module 410 determining a charge interruption schedule for each EV in the sector that is charging. The schedule indicates when the charging of the EV is to be interrupted and for how long. In exemplary embodiments, the EVs with higher range of operational windows of charge get the later charging times and are requested interrupt charging for longer periods, whereas the EVs that with smaller or narrower operational windows of charge get the earlier times. In exemplary embodiments, a strategy determined by the strategy module 410 is to stop charging of all the EVs in the sector.

The strategy module 410 transmits instructions for charge interruption to the appropriate EVs in the sector based on the determined strategy. The instructions describe to an EV how the EV charging should be interrupted. The transmitted instructions allow the EVs to execute the strategy determined by the strategy module 410. In exemplary embodiments, the strategy module 410 transmits with the instructions information as to why the strategy is being put into effect (e.g., because current electric energy consumption is greater than current electric generation availability).

The vehicle may have a minimum SOC that may be determined by the vehicle, the vehicle user, the aggregator, or a combination. The EV may have a maximum level of SOC, for example, 100%, 95%, 90%, or the like. The maximum level of SOC 204 of an EV may be determined by the vehicle, the vehicle user, the aggregator, or a combination.

A notification module 412 transmits messages to a user of the EV 102. In exemplary embodiments, when the energy consumption module 408 identifies the EV 102 from the tracking server 112, the notification module 412 sends a message with information as to how charging of the EV 102 will be interrupted according to the instructions. For example, if instructions received from the tracking server 112 indicate to interrupt charging for two hours, the notification module 412 sends a message to the user that states that charging of the EV 102 will be delayed by two hours. Based on information received from the tracking server 112, the notification module 412 additionally includes in the message an explanation of why the EV 102 is being charged according to instructions from the tracking server 112. For example, the explanation may be that the electric consumption in the sector is too high and the charging will resume after the time period requested in the DR signal has elapsed. In exemplary embodiments, the notification module 412 transmits messages to the user when one or more of the following occurs: when the charging module 308 initiates the charging of the EV 102, when charging of the EV is stopped, and when the EV 102 has reached full charge. In exemplary embodiments, the notification module 412 may receive an approval/disapproval response from a user of the EV 102. The notification module 412 may forward the response to the energy consumption module 408, which may interrupt charging of the EV based on the approval/disapproval response.

In exemplary embodiments, messages are transmitted by the notification module 412 to the user's mobile device as short message service (SMS) messages or multimedia messaging service (MMS) messages. In exemplary embodiments, messages are transmitted by notification module 412 to the user's mobile device and appear on the mobile device as part of a mobile application that provides information about the EV 102. In exemplary embodiments, messages are transmitted to the user's email address as emails.

Figure 5:
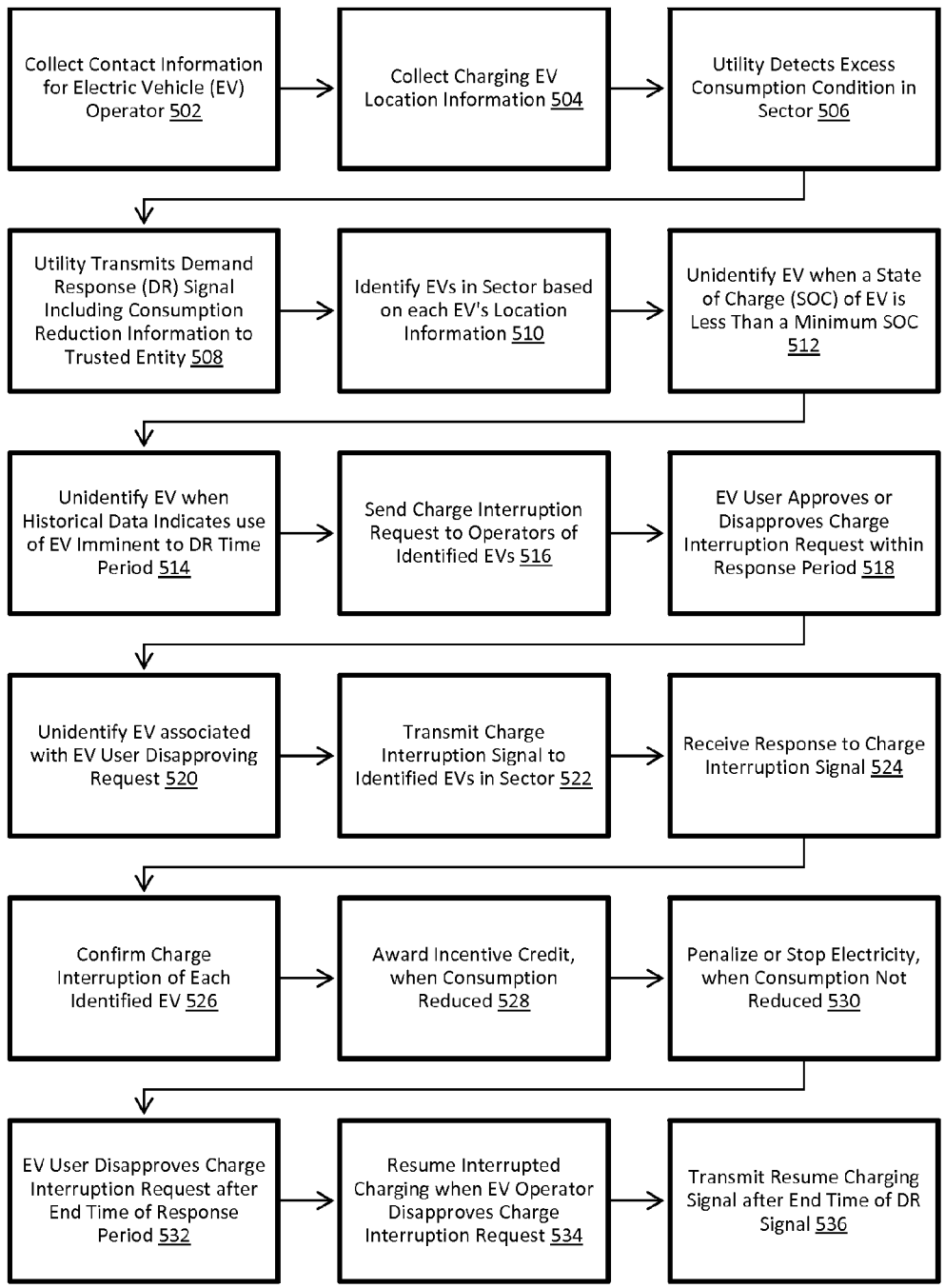
FIG. 5 illustrates a flowchart for a method for sending a Demand Response (DR) signal to an Electric Vehicle (EV) in accordance with one embodiment of the present application.

FIG. 5 is an exemplary illustration of a method for a tracking server 112 processing a Demand Response (DR) signal for electric vehicles in accordance with one embodiment of the present application. The tracking server 112 may be managed or operated by a trusted entity. A method 500 may be used to address excessive electricity consumption or load for a sector. The method 500 may be used to reduce consumption of electricity by vehicles in a sector. Method 500 may be performed by the tracking server for charging the EV 102.

The method 500 may include storing or obtaining contact information for an EV user at operation 502. The storing and collecting of electric vehicle related information may be collected by a trusted entity. The electric vehicle related information may include, for example, a vehicle's location, one or more authorized users of the EV 102, historical usage, predicted use, charging data for the vehicle, or the like.

In exemplary embodiments, the trusted entity may be an Original Equipment Manufacturer (OEM). In exemplary embodiments, the trusted entity may be Honda Motor Company or a subsidiary thereof. In exemplary embodiments, the trusted entity may include a joint venture of automobile manufacturers. A sale or license to use an electric vehicle may be conditioned on an electric vehicle user allowing electric vehicle related information to be transmitted to the trusted entity.

The method 500 may include storing or obtaining location information for electric vehicle while it is charging or traveling at operation 504. When an EV is connected to a charging station and the charging of an EV is initiated using a charging method 500, identifying information for the electric vehicle is transmitted to and received by the tracking server 112, for example, to update the location information of the electric vehicle at operation 504. The identifying information of the electric energy may include a SOC of the EV 102, a minimum SOC level for the EV 102, a maximum SOC level for the EV 102, an operational window, a threshold, a utility rate, a predicted use of the EV 102, electricity supply information, electricity demand information, information for electric energy supplied to the charging station and the like. The identifying information of the electric energy may be provided by the EV 102. In exemplary embodiments, one or more parameters included in the identifying information of the electric energy may be supplied by a grid operator, for example, by the utility server 114. In exemplary embodiments, one or more parameters included in the identifying information of the electric energy may be supplied be an aggregator, in other words, a commercial charging station used to energize multiple electric vehicles at one time.

The minimum level of SOC may be set be to range between 20% of a vehicle maximum capacity charge level to 90% of, for example, 20% or greater, 25% or greater, 30% or greater, 35% or greater, 40% or greater, 45% or greater, 45% or greater, 50% or greater, 55% or greater, 40% or greater, 65% or greater, 70% or greater, 75% or greater, 80% or greater, 85% or greater, or the like.

The maximum level of SOC may be set be to range between 50% of a vehicle maximum capacity charge level to 90% of a vehicle maximum capacity charge level, for example, 50% or greater, 55% or greater, 40% or greater, 65% or greater, 70% or greater, 75% or greater, 80% or greater, 85% or greater, 90% or greater, 95% or greater, or the like.

In exemplary embodiments, when the monitoring determines that the EV has been charged to a minimum state of charge, the electric vehicle may update the tracking server 112 with the updated SOC.

The method 500 may include detecting, determining, predicting or forecasting an excessive load condition for a sector at operation 506. The excessive electricity consumption may be real-time, be predicted, be imminent or be for a time period. For example, the utility may detect an overload condition on the electrical grid for a particular sector. In exemplary embodiments, a utility may predict or forecast brownout conditions based on a weather forecast, historical data or the like. In exemplary embodiments, a utility may forecast a brownout because an electricity generation plant may be scheduled for maintenance, be under repair or the like.

In exemplary embodiments, the method 500 may include the utility issuing or transmitting a demand response (DR) signal to a trusted entity at operation 508. The DR signal may include consumption reduction information. The consumption reduction information may include sector information, an electricity consumption reduction amount, time period information, an incentive to stop charging of an electric vehicle, and the like.

The method 500 may include identifying electric vehicles in the sector at operation 510. For example, the tracking server 112, per method 500, may map the sector information into an area grid and determine what electric vehicles are currently charging in the area specified by the sector information. For example, the tracking server 112, per method 500, may determine a count for the number of electric vehicles that need to stop charging in order to comply with the DR signal. When the count is less than the number of vehicles charging in the sector, the tracking server 112, per method 500, may only signal the number of electric vehicles needed to comply with the DR signal. In exemplary embodiments, the tracking server 112, per method 500, may supplement the number of electric vehicles by a percentage. The percentage may compensate for how many electric vehicles are expected not to comply with the DR signal request. The percentage may be based on historical data, anecdotal data or a constant.

In exemplary embodiments, the method 500 may include culling or unidentifying one or more of the identified electric vehicles prior to sending a charge interruption signal to the identified electric vehicles. For example, at operation 512 the tracking server 112, per method 500, may unidentify one of the identified electric vehicles when a state of charge of the electric vehicle is less than a minimum state of charge. In exemplary embodiments, the tracking server 112 may unidentify one of the identified electric vehicles when historical data for the respective electric vehicle indicates that the use of the respective vehicle is imminent to the time period specified in the DR signal from the utility.

In exemplary embodiments, the method 500 may include sending a charge interruption request to a user of the identified electric vehicles at operation 516. A user may include one or more operators of a vehicle, a vehicle driver, an owner of a vehicle, the person assigned to manage the vehicle like a dispatcher, or the like. The charge interruption request to the user may request a response within a specified period.

The method 500 may include an electric vehicle user approving or disapproving the charge interruption request within a desired response time period, at operation 518. The approval or disapproval of the user may be transmitted to or received by the tracking server 112, per method 500. The response of the user approving or disapproving the charge interruption may be recorded by the tracking server 112. In exemplary embodiments, when the user disapproves the charge interruption request the tracking server 112, per method 500, may unidentify the electric vehicle associated with the user disapproving the charge interruption request at operation 520.

The method 500 may include sending a charge interruption signal to the identified electric vehicles in the sector at operation 522. At operation 522 the tracking server may send a charge interruption signal to one, some or all electric vehicles in the sector. At operation 524, the method 500 may include receiving a response to the charge interruption signal from one or more of the identified electric vehicles. The tracking server 112, per method 500, may confirm charge interruption of the electric vehicle associated with the response to the charge interruption signal at operation 526.

At operation 528, the method 500 may include awarding an incentive, revenue or credit to the user of the electric vehicle complying with the charge interruption signal and reducing consumption of electricity from the electric grid in response to the charge interruption signal from the tracking server. The revenue may be based on the duration of the charge interruption. The user revenue may be computed or received. The user revenue may be recorded with the identifying information of the electric vehicle user.

At operation 530, the method 500 may include penalizing a user of the electric vehicle for not reducing consumption of electricity from the electric grid in response to the charge interruption signal from the tracking server. In exemplary embodiments, at operation 532 per method 500, the tracking server 112, may stop electric consumption by the electric vehicle even after an electric vehicle fails to comply with an initial interruption request signal, for example, per a vehicle user's disapproval, failing to comply with the initial charge interruption signal by the tracking server or the like.

The method 500 may include a vehicle user disapproving a charge interruption request after a response period for the interruption has passed or elapsed at operation 532. In response, the tracking server 112 may send a resume charging signal to the electric vehicle prior to the end time associated with the DR signal elapsing.

The tracking server 112, per method 500, may transmit a resume charging signal to the identified electric vehicles in the sector after the end time of the DR signal has elapsed at operation 536.

In exemplary embodiments, at operation 536 method 500 may include calculating or determining a resume charging time to reinitiate the charging of the vehicle. The calculating or determining may be, for example, based on a cancel charge interruption request. The cancel charge interruption request may be received from a system, a utility server, the end time included in the consumption reduction information from the utility, or the like.

The above-described embodiments according to the present disclosure may be implemented in the form of a program command that may be executed through various constituent elements of a computer, and the program command may be recorded on a computer-readable recording medium. The above-described computer-readable recording medium may independently include a program command, a data file, a data structure, or the like or may include a combination thereof. The program command recorded on the computer-readable recording medium is designed and configured especially for the present disclosure and may be known to those skilled in the art in the field of computer software to be usable. Examples of the computer-readable recording medium include a magnetic medium such as a hard disk, a floppy disk, or a magnetic tape, an optical recording medium such as a CD-ROM or a DVD, a magneto-optical medium such as a floptical disk, and a hardware device such as a ROM, a RAM, or a flash memory that is especially configured so as to store and execute the program command. Examples of the program command include not only a machine code that is produced by a complier but also a high-level language code that may be executed by a computer using an interpreter or the like. The above-described hardware device may be configured to operate as one or more software modules used for performing the process according to the present disclosure, and the program command may be implemented as one or more hardware devices.

While the exemplary embodiments have been shown and described, it will be understood by those skilled in the art that various changes in form and details may be made thereto without departing from the spirit and scope of the present disclosure as defined by the appended claims.

In addition, many modifications may be made to adapt a particular situation or material to the teachings of the present disclosure without departing from the essential scope thereof. Therefore, it is intended that the present disclosure not be limited to the particular exemplary embodiments disclosed as the best mode contemplated for carrying out the present disclosure, but that the present disclosure will include all embodiments falling within the scope of the appended claims.

What is claimed is:

1. A computer-implemented method for reducing electric consumption by an electric vehicle connected to a charging station, the method comprising:

providing a wireless network for communication between an electric vehicle and a tracking server operated by a trusted entity;

collecting, on the tracking server, user and location information for charging electric vehicles (EVs);

receiving, at the tracking server, a demand response signal determined and transmitted by a utility using a predictive model in response to at least predicting an excessive load condition for a sector;

identifying, at the tracking server, electric vehicles charging in the sector based on each EV's location information and the demand response signal; and transmitting, from the tracking server, a charge interruption signal to the identified electric vehicles in the sector prior to an occurrence of the excessive load condition.

2. The method of claim 1, further comprising transmitting, from the tracking server, a charge interruption message to a user of each of the identified electric vehicles.

3. The method of claim 1, further comprising:

transmitting, from the tracking server, a charge interruption request to a user of each of the identified electric vehicles;

receiving, at the tracking server, a disapproval of the charge interruption request within a response period from the user of one of the identified electric vehicles; and unidentifying the one of the identified electric vehicles as one of the identified electric vehicles.

4. The method of claim 1, further comprising:

transmitting, from the tracking server, a charge interruption request to a user of each of the identified electric vehicles;

receiving, at the tracking server, a disapproval of the charge interruption request after a response period from the user of one of the identified electric vehicles; and resuming the charging of the one of the identified electric vehicles.

5. The method of claim 1, further comprising unidentifying one of the identified electric vehicles when a State of Charge (SOC) of the one of the identified electric vehicles is less than a minimum SOC.

6. The method of claim 1, further comprising unidentifying one of the identified electric vehicles when historical data indicates usage of the one of the identified electric vehicles is imminent.

7. The method of claim 1, further comprising confirming, at the tracking server, a charge interruption of each of the identified electric vehicles.

8. The method of claim 7, further comprising awarding an incentive or credit to each of the identified electric vehicles confirming charge interruption.

9. The method of claim 1, wherein the transmitting of the charge interruption signal is initiated prior to a charge interruption start time specified in the time period information.

10. The method of claim 1, further comprising transmitting a charge resumption signal after a charge interruption end time specified in the time period information.

11. A vehicle system for reducing electric consumption by an electric vehicle connected to a charging station, the system comprising:

a tracking server operated by a trusted entity; and a wireless network for communicating between an electric vehicle and the tracking server, wherein the tracking server is configured to collect user and location information for charging electric vehicles (EVs);

receive a demand response signal determined and transmitted by a utility using a predictive model in response to predicting an excessive load condition for a sector;

identify electric vehicles charging in the sector based on each EV's location information and the demand response signal; and transmit a charge interruption signal to the identified electric vehicles in the sector prior to an occurrence of the excessive load condition.

12. The system of claim 11, wherein the tracking server is further configured to transmit a charge interruption message to a user of each of the identified electric vehicles.

13. The system of claim 11, wherein the tracking server is further configured to transmit a charge interruption request to a user of each of the identified electric vehicles;

receive a disapproval of the charge interruption request within a response period from the user of one of the identified electric vehicles; and unidentify the one of the identified electric vehicles as one of the identified electric vehicles.

14. The system of claim 11, wherein the tracking server is further configured to transmit a charge interruption request to a user of each of the identified electric vehicles;

receive a disapproval of the charge interruption request after a response period from the user of one of the identified electric vehicles; and resume the charging of the one of the identified electric vehicles.

15. The system of claim 11, wherein the tracking server is further configured to unidentify one of the identified electric vehicles when a State of Charge (SOC) of the one of the identified electric vehicles is less than a minimum SOC.

16. The system of claim 11, wherein the tracking server is further configured to unidentify one of the identified electric vehicles when historical data indicates usage of the one of the identified electric vehicles is imminent.

17. The system of claim 11, wherein the tracking server is further configured to confirm charge interruption of each of the identified electric vehicles.

18. The system of claim 17, wherein the tracking server is further configured to award an incentive or credit to each of the identified electric vehicles confirming charge interruption.

19. The system of claim 17, wherein the tracking server is further configured to transmit the charge interruption signal prior to a charge interruption start time specified in the time period information.

20. The system of claim 11, wherein the tracking server is further configured to transmit a charge resumption signal after a charge interruption end time specified in the time period information.

* * * * *